United States Patent [19]
Bart et al.

[11] 4,318,036
[45] Mar. 2, 1982

[54] PULSE WIDTH MODULATOR FOR A TELEVISION RECEIVER

[75] Inventors: Stan Bart, Hoffman Estates; Gopal K. Srivastava, Buffalo Grove, both of Ill.

[73] Assignee: Zenith Radio Corporation, Glenview, Ill.

[21] Appl. No.: 205,819

[22] Filed: Nov. 10, 1980

[51] Int. Cl.³ .................... H01J 29/70; H01J 29/76
[52] U.S. Cl. ..................... 315/408; 315/370; 358/180
[58] Field of Search ............ 315/387, 408, 370, 411; 358/180

[56] References Cited
U.S. PATENT DOCUMENTS 3,992,648  11/1976  Avery ........................... 315/387
4,225,809   9/1980  Ogawa et al. .................. 315/408

Primary Examiner—Theodore M. Blum

[57] ABSTRACT

A pulse width modulator is described for width-modulating horizontal rate pulses developed in a television receiver and for applying the width-modulated pulses to the receiver's horizontal drive system. In the illustrated embodiment, the modulator includes a differential amplifier which senses the receiver's high voltage and beam current to develop a control signal which varies in accordance with variations in the beam current and the high voltage. A second differential amplifier receives the control signal and horizontal rate pulses for developing pulses whose width is varied in response to variations in the control signal. The width-modulated pulses cause the horizontal drive system to generate a substantially constant horizontal picture size despite variations in line voltage and brightness.

13 Claims, 2 Drawing Figures

PULSE WIDTH MODULATOR FOR A TELEVISION RECEIVER

BACKGROUND OF THE INVENTION

The invention relates generally to improvements in television receivers. It is particularly directed to a pulse width modulator for varying the width of horizontal rate pulses which are further processed to deflect the receiver's electron beam or beams.

Some television receivers include a pulse width modulator which receives horizontal rate pulses from a pulse generator and modifies the width of those pulses in response to certain other inputs. The width-modulated pulses may then be applied to a horizontal output transistor which drives the receiver's yoke to deflect the receiver's electron beam, and which also drives a flyback transformer from which the receiver's high voltage is derived. If the widths of the modulated pulses are properly controlled to control the on-time of the horizontal output transistor, the high voltage will be held constant. Consequently, the horizontal size of the picture can be held reasonably constant despite variations in line voltage.

The high voltage generating circuit discussed above is commonly referred to as a switched-mode power supply. Generally, all the receiver's circuits are energized, directly or indirectly, from this supply, including the generator which develops the pulses and the modulator which varies the width of the pulses. Hence, when the receiver is first turned on, it is necessary to temporarily provide the pulse generator and the modulator with power other than that normally provided by the switched-mode power supply (which is initially inoperative when the receiver is first turned on).

For this purpose, such receivers commonly include a start-up transformer which is energized by line voltage as soon as the receiver is turned on. The voltage developed by this transformer is used to temporarily power the pulse generator and modulator to start the switched-mode power supply. When the latter supply is operative, the start-up transformer is deactivated and the pulse generator and modulator are powered by the switched-mode power supply.

For reasons of economy, the start-up transformer is usually selected to be as small as possible. Consequently, its load regulation is poor. In addition, it usually develops a low output voltage under conditions in which the AC line voltage is lower than normal. Consequently, the pulses developed by the power generator are of an abnormally low amplitude. Because of these factors, special consideration must be given to the design of the modulator which receives the output of the pulse generator and which supplies width-modulated pulses to the horizontal output transistor.

Specifically, before the start-up transformer is deactivated, the modulator should be: (1) in a state which deactivates circuitry downstream of the modulator so as to reduce the load on the start-up transformer and ensure that the pulse generator is adequately powered to begin developing its output pulses; and (2) biased symmetrically, i.e., with no offset, so that its sensitivity to input pulses is high. This will ensure the production of output pulses even when the modulator receives pulses of low amplitude from the pulse generator.

A further consideration relates to the degree to which the modulator alters the widths of the horizontal rate pulses. If the modulator can output a pulse with a zero or a 100% duty cycle, horizontal scan and the high voltage which is usually derived from the horizontal deflection circuitry may be shut down. Such may occur, for example, when the line voltage powering the receiver undergoes a sudden decrease and the modulator responds by generating an essentially D.C. output.

Prior pulse width modulators have not satisfactorily responded to the foregoing considerations. In addition, conventional pulse width modulators, operating as they do in a substantially open loop mode, have not operated with the desired degree of consistency. The present invention provides a pulse width modulator which meets the requirements discussed above and operates to maintain a substantially constant picture size as line voltage changes and as the receiver's beam current changes.

OBJECTS OF THE INVENTION

It is a general object of the invention to provide an improved modulator for modulating the widths of horizontal rate pulses in a television receiver so as to maintain a substantially constant picture size.

It is a more specific object of the invention to provide such a pulse width modulator which consistently provides pulse outputs, even during power up on low line voltage.

It is a further object of the invention to provide a pulse width modulator whose output state powers down circuitry downstream of the modulator in the absence of incoming horizontal rate pulses.

Yet another object of the invention is to provide such a modulator whose output pulse width variations are limited to a controlled range, and which generates consistent and reproducible outputs.

BRIEF DESCRIPTION OF THE FIGURES

The objects stated above and other objects of the invention are set forth with more particularity in the following detailed description and in the accompanying drawing, of which.

DESCRIPTION OF THE PREFERRED EMBODIMENT

Figure 1:
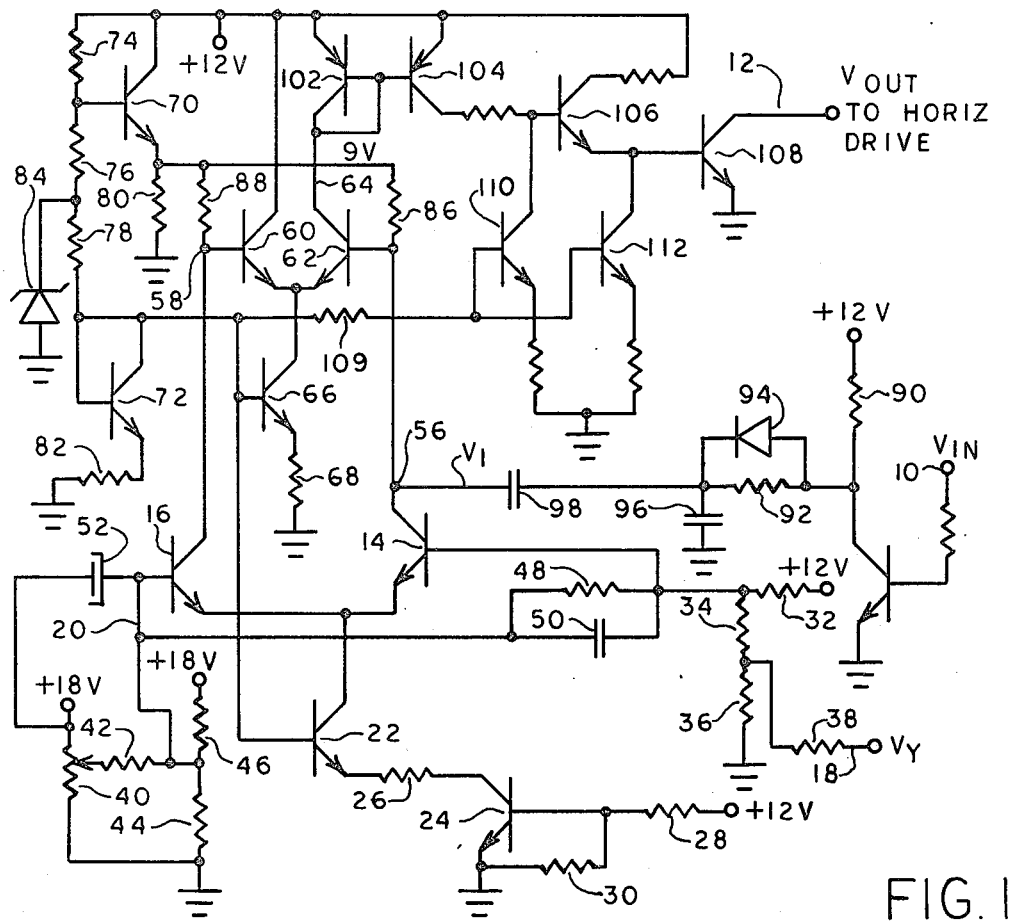
FIG. 1 illustrates a pulse width modulator in accordance with the invention.
Figure 2:
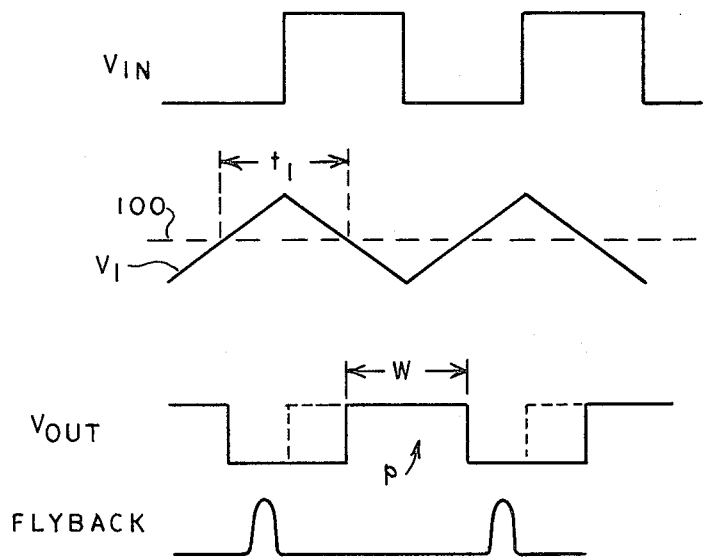
FIG. 2 depicts various waveforms useful in describing the operation of the modulator shown in FIG. 1.

Referring to FIG. 1, a pulse width modulator for a television receiver is shown which receives horizontal rate pulses (Vin) at an input terminal 10 and develops width-modulated pulses (Vout) at an output terminal 12. Representative waveforms associated with the input pulses Vin and the output pulses Vout are shown in FIG. 2. With respect to the pulses Vin, suffice it to say that they have a frequency of about 15,734 hertz and are developed in other circuitry (not shown) in the receiver.

The width-modulated pulses at the output terminal 12 may be applied to a conventional horizontal driver (not shown) whose output is coupled to a suitable horizontal output transistor. The signal developed by the latter transistor is applied to the receiver's yoke for deflecting the receiver's electron beam or beams in a horizontal direction, and is also used to drive a high voltage power supply in the receiver. Hence, the receiver's high voltage and its horizontal deflection are both controlled by the output pulses at terminal 12. Such an arrangement is conventional and is employed, for example, in television chassis No. 25GC50, manufactured by Zenith Radio Corporation.

Before describing the modulator, the effect which a change in beam current has on picture size and on high voltage should first be understood. Typically, in a receiver with no high voltage regulation, an increase in beam current results in a substantially constant horizontal size of the receiver's picture. Conversely, in a receiver that does have high voltage regulation, an increase in beam current tends to reduce the high voltage (due to the source impedance of the high voltage generator), but the regulator compensates by increasing the on-time of the horizontal output transistor to hold the high voltage more nearly constant. This results in a higher stored energy and, therefore, greater peak-to-peak yoke current. Consequently, the horizontal size of the receiver's picture is increased.

One of the principles of the present invention is that it is desirable to regulate the high voltage to compensate for changes in line voltage, but it is not desirable to regulate the high voltage in response to changes in beam current. Accordingly, a feedback signal which is indicative of beam current changes is employed to offset any high voltage regulation which would otherwise occur in response to beam current changes. Hence picture size is held constant. However, if only line voltage changes, high voltage regulation is maintained. This also holds the picture size constant. Hence, in the event of either a line voltage change or a change in beam current, the horizontal size of the receiver's picture is held constant.

Referring more specifically to the modulator, it includes means comprising transistors 14 and 16 for sensing the receiver's beam current at an input 18 and for sensing a signal representative of the receiver's high voltage at another input 20. As shown, transistors 14 and 16 are connected as a differential amplifier receiving operating current from a D.C. source comprising transistors 22 and 24 and resistors 26, 28 and 30. This D.C. source is biased on by the voltage divider comprising resistors 28 and 30 which are coupled between ground and a 12 volt supply voltage.

The base of the transistor 14 is coupled to resistors 32, 34 and 36 which are connected, as shown, between the 12 volt supply and ground to provide bias for the transistor 14. The junction between the resistors 34 and 36 is coupled via another resistor 38 to the input 18 for receiving a signal $V_y$ which varies inversely with respect to beam current. Thus, as beam current increases, the voltage received at the base of transistor 14 decreases.

The base of the transistor 16 is biased by a resistive network coupled between ground and an 18 volt supply, comprising a variable resistor 40 (used to set the high voltage at a nominal value) and fixed resistors 42, 44 and 46. The 18 volt supply is derived from the receiver's high voltage supply, wherefore variations in the latter supply are converted to variations in the bias applied to the base of the transistor 16. With this arrangement, the relative conduction levels of transistors 14 and 16 are controlled by the receiver's beam current and its high voltage. As mentioned previously, the receiver's high voltage is a function of line voltage as well as beam current. Thus, the relative conduction levels of transistors 14 and 16 are also a function of line voltage.

Coupled between the bases of transistors 14 and 16 is a resistor 48 which controls their gain, and a filter comprising capacitors 50 and 52.

When the receiver is in its powered up state (i.e., the 12 volt supply and the 18 volt supply are at their design levels), the transistors 14 and 16 generate a differential control signal between their collectors which is used to control the direction in which pulse widths are varied and the extent of such variation.

The collectors of transistors 14 and 16 are coupled to nodes 56 and 58, respectively, for controlling the bias on another differential amplifier comprising transistors 60 and 62. As described in more detail below, this latter differential amplifier receives, at node 56, integrated horizontal rate pulses from terminal 10 for developing, at a collector lead 64, current pulses whose widths are varied according to the control signal developed by transistors 14 and 16.

More specifically, the transistors 60 and 62 receive a D.C. source current developed by a transistor 66 and a resistor 68. Bias for the transistor 66 is provided by a power supply which includes transistors 70 and 72, resistors 74, 76, 78, 80 and 82, and a zener diode 84. In the receiver's powered up condition, the zener diode 84 establishes a reference voltage at the junction between resistors 76 and 78 for developing a controlled reference bias at the base of the transistor 66. At the emitter of the transistor 70, a nine volt D.C. voltage is provided for powering the transistors 14 and 16 via resistors 86 and 88 and for supplying a bias voltage to the bases of transistors 60 and 62.

The input pulses received at terminal 10 are applied to an integrator comprising resistors 90 and 92, a diode 94 and a capacitor 96. The integrated input pulses are applied to the base of transistor 62 via a coupling capacitor 98. The resultant signal $V_1$ at the base of the transistor 62 includes integrated input pulses superimposed on the D.C. bias at node 56. FIG. 2 illustrates the signal $V_1$ in relation to the D.C. bias level (dashed line 100) at the base of the transistor 60. Thus, when the signal $V_1$ goes above the line 100, the transistor 62 conducts. Where the signal $V_1$ is below the line 100, the transistor 60 conducts. By varying the relative position of the signal $V_1$ relative to the line 100, the conduction time of the transistor 62 and the width of the pulses at output terminal 12 are varied. The differential control signal developed by the transistors 14 and 16 varies the relative bias on the transistors 60 and 62 to effect such a change.

As stated above, a current pulse is developed in the lead 64 in response to each pulse input at terminal 10. These current pulses are applied to a current mirror comprising transistors 102 and 104 for applying corresponding pulses of current to an emitter-follower transistor 106. The latter transistor couples voltage pulses to an inverting output transistor 108 whose collector is coupled to the output 12. Hence, for each positive current pulse developed by the transistor 62, a negative voltage is developed at the output 12. Because of the inversion provided by the transistor 108, an increasingly wide current pulse in lead 64 is converted to an increasingly narrow positive voltage pulse at output 12.

Transistors 110 and 112 are coupled by their collectors to the base and emitter, respectively, of the transistor 106, and their bases are coupled via an isolation resistor 109 to the bases of transistors 22, 66 and 72. With this arrangement, the transistors 110 and 112 both saturate when the current in transistor 104 terminates so as to provide a rapid fall time for each output pulse at terminal 12.

The over-all operation of the modulator is best described by assuming that the receiver is in its powered up state, that the beam current signal $V_y$ at lead 18 is steady, and that line voltage has increased so as to increase the receiver's high voltage. In this condition, the 18 volt supply increases in value and the voltage at the base of transistor 16 increases. Consequently, the conduction of transistor 16 increases, the conduction of transistor 14 decreases, the voltage at node 58 decreases, and the voltage at node 56 increases. Therefore, the signal $V_1$ rises further above the bias at node 58 to render the transistor 62 conductive for a longer interval. If the voltage $V_1$ has the relationship to the bias on node 58 as shown in FIG. 2, the transistor 62 conducts for the interval shown as $t_1$. A current pulse of the same duration is generated in collector lead 64 so that a voltage pulse is developed at output lead 12. A further positive increase in the signal $V_1$ would provide a longer lasting current pulse in the lead 64 and a narrower positive voltage pulse at the lead 12. Hence, the increase in the receiver's high voltage causes the transistor 62 to conduct for a longer interval for developing a narrower output pulse at lead 12. The narrower output pulse is converted by the receiver's high voltage generator to a lower high voltage and a smaller signal at the base of the transistor 16. Consequently, the value of the high voltage is held constant and the size of the receiver's picture is also held more constant.

Assuming now that the receiver's beam current increases, the signal $V_y$ therefore decreases. However, as the beam current increases, the receiver's high voltage decreases. Consequently, the voltages at the bases of transistors 14 and 16 both decrease, and the differential voltage across their bases remains substantially constant. The conduction levels of transistors 14 and 16 do not change, therefore. Hence, the pulse width at terminal 12 remains substantially constant so that the receiver's high voltage is allowed to decrease with an increase in beam current. Thus, the receiver's picture size remains substantially constant. It can be seen, therefore, that, in general, a selected amount of the signal $V_y$ is applied to the base of the transistor 14 to compensate for changes in the high voltage which are due to changes in the receiver's beam current. The values of resistors 32, 34, 36 and 38 may be selected to develop the degree of compensation desired.

When the receiver's line voltage causes an increase in the receiver's high voltage without a change in beam current, narrower positive pulses are generated at the output 12 in order to reduce the high voltage and to maintain the receiver's horizontal picture size substantially constant.

Referring now to the waveform identified as Vout in FIG. 2, a pulse P is shown having a given pulse width W. As line voltage decreases and causes the receiver's high voltage to decrease, the modulator increases the width of the pulse P as shown in the dashed lines. It is important, however, to ensure that the pulse P is not widened (or shrunk during transient or very high AC line conditions) to the extent that the signal Vout becomes a steady, high level D.C. signal. Further, it is desirable that the pulse P not be widened further than shown by the dashed line. Otherwise, the pulse p assumes a high level during the receiver's retrace interval during which the illustrated flyback pulse occurs. Extending the pulse P into the retrace interval causes the receiver's horizontal driver and the horizontal output stages to be activated for unnecessarily long intervals, resulting in increased power consumption. The modulator of FIG. 1 is adapted to restrict the width of the output pulses so that they do not occur during the retrace interval.

Specifically referring to the transistor 24, this transistor saturates in normal operation so that the resistor 26 is essentially grounded. Thus, the current in the transistor 22 is controlled by the value of the resistor 26. By choosing the proper value for the resistor 26, the current carried by the transistor 22 is controlled so as to limit the minimum D.C. voltage at node 56 to a value which ensures that the transistor 62 is turned off by integrated horizontal rate pulses for the minimum time required to develop the maximum desired positive pulse width at the output 12. The transistor 62 is also turned on in this manner for the maximum time required to develop the minimum desired positive pulse width. For example, the resistor 26 may be selected so that the current carried by the transistor 22 is about 100 microamperes when the resistor 86 is selected to have a value of 5,000 ohms and the peak-to-peak amplitude of the AC signal at node 56 is about 2 volts. If the current carried by the transistor 22 were too large, the D.C. voltage at node 56 could be lowered such that the transistor 62 could be turned on either not at all or for only a very short interval for each input pulse at terminal 10. Consequently, the positive output pulses at lead 12 would be much wider than desired.

It is also desirable to control the minimum widths of those pulses and to provide the system with greater range when narrow pulse widths are developed. For example, at high line voltages, the modulator develops narrow pulse widths as described above. If the pulses become so narrow as to be non-existent, i.e., a low level D.C. signal is generated, the horizontal deflection circuitry could be momentarily shut down, after which the modulator would attempt to restart it again. To avoid this problem, the differential amplifier comprising transistors 60 and 62 is given an offset in the form of unsymmetrical biasing so that the modulator can operate at relatively high line voltages to regulate the high voltage supply without permitting the modulator's output pulses to be so narrow as to be non-existent.

For purposes of explanation, assume that the integrated pulse input at node 56 has a peak-to-peak amplitude of 2 volts, that the current carried by the transistor 22 is 100 microamperes, and that the resistors 86 and 88 are each 10,000 ohms. When the voltage at the base of the transistor 16 is driven low in response to low line voltage, the transistor 16 is turned off and the transistor 14 is turned on. Consequently, the voltage at the node 58 rises to 9 volts and the voltage at node 56 decreases to 8 volts. In this condition, the AC signal at node 56 may not be able to turn the transistor 62 on, wherefore no AC signal would be developed at the output 12.

A similar result may occur in the case where the transistor 16 is on and the transistor 14 is off. With the node 58 at 8 volts and the node 56 at 9 volts, the AC signal at node 56 may not be able to turn the transistor 62 off, wherefore no AC signal would be developed at the output 12.

However, if the resistor 86 is only 5,000 ohms and the resistor 88 is 7,500 ohms under the conditions stated above wherein the transistor 16 is off, the voltage at node 56 decreases to 8.5 volts when the voltage at node 58 rises to 9 volts. With this smaller differential voltage between the nodes 56 and 58, the AC signal at node 56 is able to turn the transistor 62 on for developing output pulses.

In the case where the transistor 16 is on and the transistor 14 is off, the voltage at node 58 drops to 8.25 volts while the voltage at node 56 rises to 9 volts. Accordingly, the transistor 62 is held on for a longer period of time for developing a pulse at output 12 of a minimum width. Hence, the operating range of the transistor pair 60-62 is increased at the narrow pulse width end of the operating range so that the modulator has enough range to control the receiver's high voltage at high values of line voltage. With this provision, the modulator can decrease the width of its output pulses to a greater extent than it can increase their width.

Another aspect of the illustrated modulator relates to its ability to deactivate the circuitry which receives the pulses from the output lead 12 at low line voltages. In the usual case, the circuitry supplying the horizontal rate pulses to terminal 10 is powered by the same 12 volt supply which powers the modulator. When the receiver is first turned on, horizontal rate pulses are not generated until the 12 volt supply reaches a certain value. During this initial powering up interval, the transistor 24 is off because its base has insufficient forward bias. Consequently, transistors 22, 14 and 16 are also nonconductive, wherefore the voltages at nodes 56 and 58 are equal in value. In addition, when the 12 volt supply is low, the zener diode 84 is not turned on so that substantially all the current flowing from the 12 volt supply and through the resistor 76 flows to the transistor 72. Hence, the transistor 66 is turned on to supply some operating current to the transistors 60 and 62. Thus, the transistor 62 conducts and turns on transistors 102, 104, 106 and 108. The conductive condition of the latter transistor pulls the voltage at lead 12 low, thereby temporarily disabling the horizontal driver which receives the modulator's output. When the 12 volt supply reaches about 4.5 volts (which is typically high enough to cause the horizontal rate pulse generator to input pulses at terminal 10), the modulator begins working normally.

Another significant aspect of the modulator is its ability to develop output pulses at lead 12 as soon as horizontal rate pulses are received at terminal 10. Should such pulses be received while the 12 volt supply is rising to its design level and before the transistor 24 is turned on, the transistors 60 and 62 will be receiving some operating current from the transistor 66 as described above. In addition, the voltages at the bases of transistors 60 and 62 will each be equal. Hence, the transistor 62 will start switching current, even though the horizontal rate signal is low in amplitude, thereby generating an output pulse at lead 12.

The modulator described above has been found to provide width-modulated output pulses which maintain a substantially constant horizontal picture size despite variations in the receiver's beam current, high voltage and/or line voltage. Its consistent start-up ability, especially when the receiver's line voltage is low, is particularly advantageous. The modulator's ability to deactivate the receiver's horizontal driver at low line voltage when no horizontal rate pulses are input to the modulator, conserves power and lowers the current drain on the receiver's power supply. Consequently, the supply voltage for the receiver's horizontal rate pulse generator reaches its design level sooner, horizontal rate pulses are generated sooner, and the receiver goes into normal operation sooner.

Although the invention has been described in terms of a preferred embodiment, it will be obvious to those skilled in the art that many modifications and alterations thereto may be made without departing from the invention. Accordingly, all such modifications and alterations are deemed to be within the spirit and scope of the invention as defined by the appended claims.

We claim:

1. In a television receiver having a source of horizontal rate pulses, a pulse width modulator for varying the width of the horizontal rate pulses, a horizontal drive system for deflecting the receiver's electron beam in response to the width-modulated pulses, and a high voltage generator powered by the horizontal drive system, an improved pulse width modulator comprising:

first means sensing the receiver's electron beam current and the amplitude of its high voltage for developing a control signal which varies in response to variations in the amplitude of the high voltage and the beam current; and second means receiving the control signal and the horizontal rate pulses for developing output pulses whose widths are varied in response to variations in the control signal such that the width-modulated pulses cause the horizontal drive system to develop a substantially constant horizontal picture size irrespective of variations in the receiver's beam current or high voltage.

2. A modulator as set forth in claim 1 wherein said second means is adapted to generate an output signal adapted to deactivate the horizontal drive system during the receiver's powering up interval when no horizontal rate pulses are generated.

3. A modulator as set forth in claim 1 wherein said second means is adapted to generate a pulse output in response to each received horizontal rate pulse during the receiver's powering up interval irrespective of whether said first means is operative during the powering up interval.

4. A modulator as set forth in claim 1 wherein said first means is responsive to the receiver's high voltage and beam current such that its control signal causes said second means to develop relatively wide output pulses at low levels of the receiver's high voltage and beam current and relatively narrower output pulses at higher levels of the receiver's high voltage and beam current.

5. A modulator as set forth in claim 4 wherein said first means is adapted to develop the control signal such that the pulses generated by said first means are limited to a maximum pulse width to prevent actuation of the horizontal drive system during the receiver's retrace interval, and limited to a minimum pulse width to avoid applying a low level D.C. signal to the horizontal drive system.

6. A modulator as set forth in claim 4 wherein said first means develops a differential control voltage, wherein said second means includes a differential amplifier receiving the differential control voltage and means for unsymmetrically biasing the differential amplifier such that the differential amplifier is adapted to decrease the width of its output pulses to a greater extent than it can increase the width of its output pulses to provide the modulator with sufficient range for controlling high levels in the receiver's high voltage.

7. A modulator as set forth in claim 1 wherein said first means includes a differential amplifier having a first input for receiving a signal representative of the receiver's high voltage, having a second input for receiving a signal representative of the receiver's beam current, and a pair of outputs between which a differential D.C. control voltage is generated.

8. A modulator as set forth in claim 7 wherein said second means includes a second differential amplifier having first and second inputs receiving said differential control signal and means for AC coupling the horizontal rate pulses to the second input such that the current carried by said second differential amplifier is modulated by said horizontal rate pulses to develop output pulses whose widths vary in accordance with variations in the control signal.

9. A modulator as set forth in claim 8 including means for integrating the horizontal rate pulses and for coupling integrated horizontal rate pulses to the second input of said second differential amplifier.

10. A modulator as set forth in claim 8 wherein said second differential amplifier is adapted to generate an output which deactivates the horizontal drive system at low line voltages.

11. A modulator as set forth in claim 8 including means for biasing said second differential amplifier such that, when said first differential amplifier is off during powering up of the receiver, said second differential amplifier is responsive to horizontal rate pulses for developing output pulses to activate the horizontal drive system.

12. In a television receiver having a source of horizontal rate pulses, a pulse width modulator for varying the width of the horizontal rate pulses, a horizontal drive system for deflecting the receiver's electron beam in response to the width-modulated pulses, and a high voltage generator powered by the horizontal drive system, an improved pulse width modulator comprising:

a first differential amplifier having a first input for receiving a signal indicative of the amplitude of the receiver's high voltage, having a second input for receiving a signal representative of the receiver's beam current, and a pair of outputs between which a differential control voltage is generated which varies in response to variations in the amplitude of the receiver's high voltage and beam current;

means for integrating the horizontal rate pulses;

a second differential amplifier having first and second inputs receiving the differential control voltage and means for coupling the integrated horizontal rate pulses to its second input such that the second differential amplifier develops, in response to each horizontal rate pulse, an output pulse whose width is varied in response to variations in the control signal; and means for biasing said second differential amplifier such that it generates an output pulse in response to each horizontal rate pulse, even in the absence of the control signal, to activate the horizontal drive system during receiver power up, and such that said second differential amplifier is adapted to generate an output which deactivates the horizontal drive system at low line voltage.

13. A modulator as set forth in claim 7 wherein the signals representative of the receiver's high voltage and beam current are applied to said differential amplifier such that the control voltage remains at a substantially constant value in response to a beam current change which causes a change in the receiver's high voltage.

* * * * *